US009642035B2

(12) United States Patent
Fang et al.

(10) Patent No.: US 9,642,035 B2
(45) Date of Patent: May 2, 2017

(54) FAST ACCESS AND CONTROL IN WIRELESS COMMUNICATIONS

(71) Applicants: ZTE Corporation, Shenzhen (CN); ZTE (USA) Inc., Morristown, NJ (US)

(72) Inventors: Yonggang Fang, San Diego, CA (US); Bo Sun, Shenzhen (CN); Kaiying Lv, Shenzhen (CN)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 0 days.

(21) Appl. No.: 14/021,621

(22) Filed: Sep. 9, 2013

(65) Prior Publication Data

US 2014/0071821 A1 Mar. 13, 2014

(30) Foreign Application Priority Data

Sep. 10, 2012 (WO) ................ PCT/CN2012/081206
Feb. 26, 2013 (WO) ................ PCT/CN2013/071889

(51) Int. Cl.

*H04W 28/02* (2009.01)
*H04W 52/02* (2009.01)
*H04W 74/04* (2009.01)
*H04W 24/00* (2009.01)
*H04W 48/00* (2009.01)
*H04W 28/06* (2009.01)
*H04W 84/12* (2009.01)

(52) U.S. Cl.

CPC ....... *H04W 28/0289* (2013.01); *H04W 24/00* (2013.01); *H04W 48/00* (2013.01); *H04W 52/0212* (2013.01); *H04W 74/04* (2013.01); *H04W 28/06* (2013.01); *H04W 84/12* (2013.01); *Y02B 60/50* (2013.01)

(58) Field of Classification Search

CPC ..... H04W 48/06; H04W 48/08; H04W 48/10; H04W 48/12; H04W 48/14; H04W 48/16; H04W 48/20; H04W 52/0206; H04W 52/0209

See application file for complete search history.

(56) References Cited

U.S. PATENT DOCUMENTS

2006/0056348 A1* 3/2006 Marinier et al. .............. 370/331
2006/0062181 A1* 3/2006 Chou ............................ 370/329
2006/0239292 A1* 10/2006 Kahana et al. ............... 370/437
2007/0110091 A1* 5/2007 Kwon ........................... 370/445
2008/0151835 A1* 6/2008 Kneckt et al. ................ 370/331
2012/0170453 A1* 7/2012 Tiwari ................ H04W 76/027 370/230
2013/0235773 A1* 9/2013 Wang ................ H04W 52/0206 370/311

* cited by examiner

*Primary Examiner* — Gary Mui
*Assistant Examiner* — Stephen Steiner
(74) *Attorney, Agent, or Firm* — Perkins Coie LLP

(57) ABSTRACT

A wireless local area network comprises an access point and at least one wireless device. The access point indicates in a downlink transmission whether access to the network is based on active scan or polling. The indication is changeable responsive to whether a beacon transmission time is approaching, whether a new scan is to be forced or whether network traffic is about to reach an overload condition.

19 Claims, 19 Drawing Sheets

| bits 2 | 4 | 1 | 1 | 1 | 1 | 1 | 1 | 1 | 1 | 1 | 1 |
|---|---|---|---|---|---|---|---|---|---|---|---|
| Protocol Version | Type | From DS | More Fragments | Retry | Power Management | More Data | Protected Frame | A-MSDU | EOSP | A3 Present | ACB |

S1 = SIFS; S2 = PIFS; S3 = DIFS/AIFS

| Rate | ACB | Length | Parity | Tail |
|---|---|---|---|---|
| 4 bits | 1 bit | 12 bits | 1 bit | 6 bits |

FIG. 6

| MCS | CBW | HT- Length |
|---|---|---|

| smooth | | ACB | | | | | | Tail |
|---|---|---|---|---|---|---|---|---|

FIG. 7

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Fragments | Retry | Power Management | More Data | Protected Frame | Order |
| 2 | 2 | 4 | 1 | 1 | 1 | 1 | 1 | 1 | 1 | 1 |

Bits:

1100 ← (arrow to table)
1102 ← (brace over B8–B15)

FAST ACCESS AND CONTROL IN WIRELESS COMMUNICATIONS

CROSS REFERENCE TO RELATED APPLICATIONS

This patent document claims the benefit of priority under 35 U.S.C. §119(a) and the Paris Convention of International Patent Application No. PCT/CN2012/081206, filed on Sep. 10, 2012, and International Patent Application No. PCT/CN2013/071889, filed on Feb. 26, 2013. The entire contents of the before-mentioned patent applications are incorporated by reference as part of the disclosure of this application.

BACKGROUND

This application relates to wireless communications.

Many smartphones currently being deployed provide Internet connectivity both through the cellular network (e.g., 3G and 4G wireless technologies such as Long Term Evolution or LTE) and through wireless local area network (WLAN) technologies such as various flavors of IEEE 802.11 standard.

The 802.11 standard was originally defined for data-centric applications (e.g., web browsing). As the number of 802.11 access points is growing, client devices, such as smartphones, often are within the coverage area of multiple access points. It will beneficial to provide techniques that extend the usefulness of the 802.11 standard to meet the ever-growing demand from smartphone users to access multimedia content through WLAN connections.

SUMMARY

This document describes technologies, among other things, about fast link setup and access control in the fast link setup. The described technologies can be used for fast initial link setup capable wireless stations or power saving stations.

In one aspect, a method of an access control for active scan used by fast initial link setup capable stations or PS-Poll used for power saving stations is provided to include defining an access blocking field in either PHY header or MAC header field of a frame transmitted from the AP to indicate whether the access blocking is enabled or not. In some embodiments, access deferring or access permitted may be indicated.

In another aspect, a method is provided for stations to receive the access blocking indication and perform the access control according to the instruction from the AP.

In addition, a method for reducing the inter-frame spaces in the inter-contention free periods is provided to reduce the time waste in the medium to improve the medium usage efficiency, which in turn helps to speed up the link setup.

In yet another aspect, a method is provided to include an example for the transmitting station to indicate the end of current contention free transmission, and a method is provided for the idle stations to detect the end of current contention free transmission interval and to use the reduced inter-frame spaces to contend the medium in the next contention window.

In yet another aspect, the methods may be embodied in a computer-readable medium having program instructions stored thereon, which, when executed cause a processor to implement the respective method.

In yet another aspect, the methods may be embodied in apparatus that includes a processor and a transceiver for receiving or transmitting wireless data.

The details of the above aspects and their implementations are set forth in the accompanying drawings, the description and the claims.

BRIEF DESCRIPTION OF THE DRAWINGS

FIG. 6 shows an example of Access Blocking Bit included in PHY L-SIG.

FIG. 7 shows an example of Access Blocking Bit included in PHY HT-SIG.

DETAILED DESCRIPTION

This document describes techniques, mechanisms, devices, and systems for fast link setup and access control for wireless communications.

Wireless communication systems can include a network of one or more access points (AP) to communicate with one or more wireless stations (STA). An access point can emit radio signals that carry data to one or more wireless stations, and a station can also transmit radio signals to the access point in the same frequency channel via time division duplexing (TDD) or in different frequency channel via frequency division duplexing (FDD).

Wireless communications can be categorized as:

wireless wide area network (WWAN)

wireless local area network (WLAN)

wireless personal area network (WPAN)

A WLAN links two or more stations in the radio coverage area and provides a connection to the Internet through an access point. An access point and a wireless station can use one or more wireless technologies for communications. Various wireless technologies examples include various versions of IEEE 802.11 and other local area networking technologies.

IEEE 802.11 is an asynchronized time division duplexing technology designated for WLAN. The basic network architecture of WLAN is built on a basic service set (BSS). The infrastructure BSS is the BSS with a central station (AP) associated with other stations and dedicated to manage the BSS. In an infrastructure BSS, both access point and stations share the same frequency channel and use TDD for data and signaling transmission.

In IEEE 802.11, the basic service set (BSS) is the building block of a Wireless Local Area Network (WLAN). Wireless stations (also called stations) with some association in the radio coverage area establish a BSS.

Figure 1:
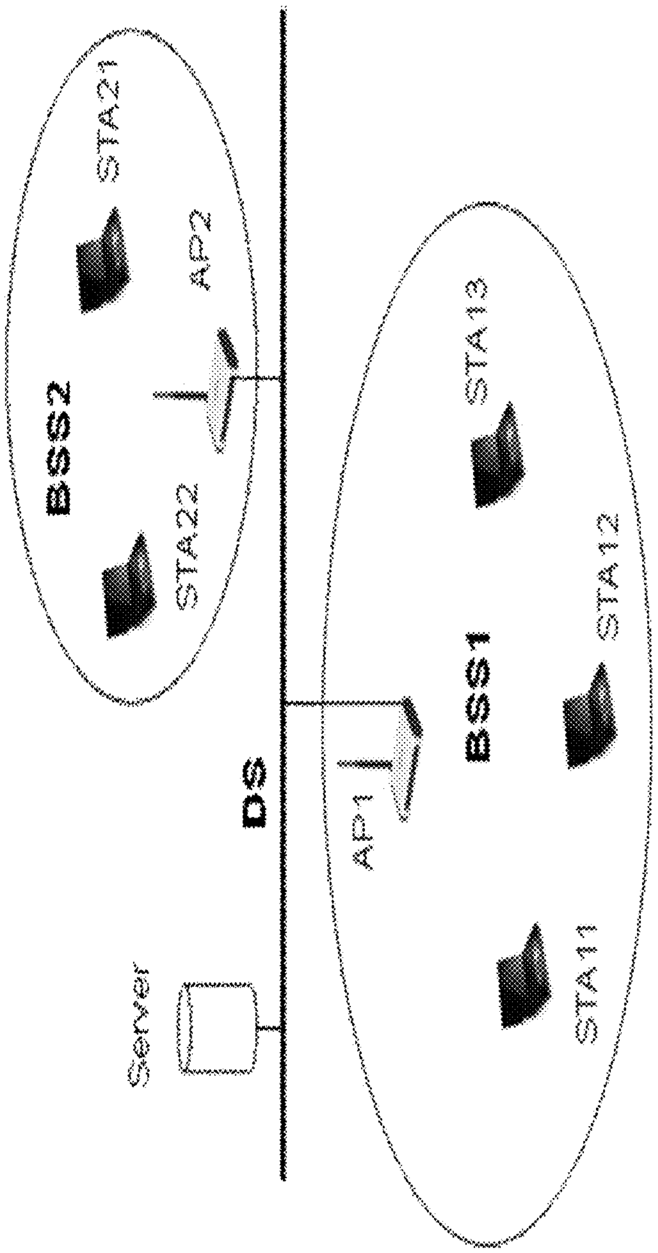
FIG. 1 shows an example of infrastructure BSS in a wireless communication system.

FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server through a distribution system (DS).

Wireless stations need to setup a communication link (or association) before they can exchange information or transmit data. Typically the link setup involves three steps:

1. Network discovery is a step that a station scans radio frequency channel to discover a BSS in its area.

2. Authentication is the process by which two stations to be communicating establish their mutual trust. The IEEE 802.11 supports two authentication methods operating at the link level: open system authentication and shared key authentication.

3. Association is the step that provides a mapping between the station and the AP. Only associated stations are allowed to transmit data within the distribution system through the AP. Association is controlled by Medium Access Control (MAC) layer and initiated by a non-AP station via sending an Association Request message to the AP. If the station's association is admitted, the AP responds with an Association Response with supported capability information and specific configuration parameters used in the BSS. For additional detail of the IEEE 802.11 specification, the March 2012 publication of IEEE 802.11 standard by the Institute of Electrical and Electronics Engineer (IEEE) is incorporated in this document by reference in its entirety.

Figure 2:
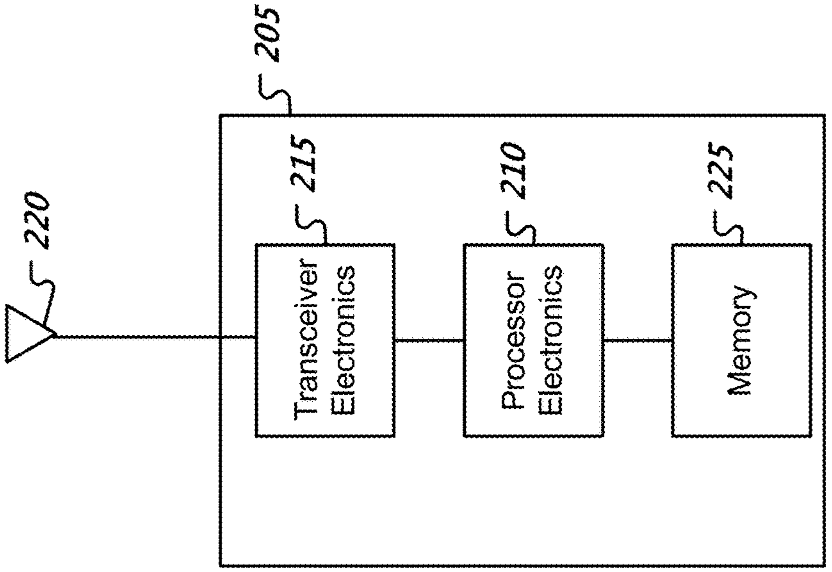
FIG. 2 shows an example of a radio transceiver station that can be used to for constructing wireless stations or access points in FIG. 1.

FIG. 2 shows an example of a radio transceiver station. Various examples of radio stations include access points and stations in FIG. 1. A radio station 205 such as an access point or a wireless station can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on IEEE 802.11 Direct Sequence Spread Spectrum air interface. In some implementations, radio stations 205 can communicate with each other based on an IEEE 802.11 Orthogonal Frequency-Division Multiplexing (OFDM) or High Throughput (HT) air interface. In some implementations, radio stations 205 can communicate using one or more wireless technologies such as IEEE 802.11, CDMA2000, Universal Mobile Telecommunications System (UMTS). And/or evolved UMTS Terrestrial Radio Access Network (E-UTRAN).

In IEEE 802.11 wireless communications, a station can use either passive scan or active scan on the radio frequency channels in the radio coverage area to discover AP(s). Typically, the network discovery takes significant time in the link setup, especially in the first initial link setup.

For the passive scan, the station tries to detect the beacon signal transmitted from AP(s) to find out the existence of AP(s). A beacon signal is broadcast by the AP periodically to carry the system information of AP. When a station detects a beacon, it knows the existence of AP and its system capability and configuration parameters. Then the station can starts the authentication process to mutual authenticate with the AP. In the normal configuration, the beacon signal cannot be transmitted too often since it will take away of the air link capacity. If there are many channels to be scanned and each scan requires longer time, the total discovery process in the passive scan would take longer time. In 5 GHz frequency band, there are 9 to 25 channels of 20/40 MHz channel bandwidth, depending on the regulation of individual countries. In the 2.4 GHz band, there are 11 to 14 channels of 20 MHz channel bandwidth. For each channel, a station has to stay at least time of dot11OBSSScanPassiveTotalPerChannel. Therefore the total discovery time could be longer for a complete search in both 2.4 GHz and 5 GHz frequency bands.

The active scan, other the other hand, could reduce the discovery time in each scan of frequency that the station operates. With active scanning a station transmits a Probe Request frame on each channel, includes the addressing information:

a. Service Set IDdentifier (SSID) or a wildcard SSID, b. BSS IDentifier (BSSID) or a wildcard BSSID.

When receiving a Probe Request, the AP shall respond with a Probe Response to the station making this request if a. address in the Probe Request is a broadcast address or b. SSID in the Probe Request is wildcard SSID or matches to the SSID of AP, or c. address field in Probe Request is the wildcard BSSID or matches BSSID of AP.

If there are multiple APs in the radio coverage area, those APs may need to respond to the Probe Requests respectively.

Figure 3:
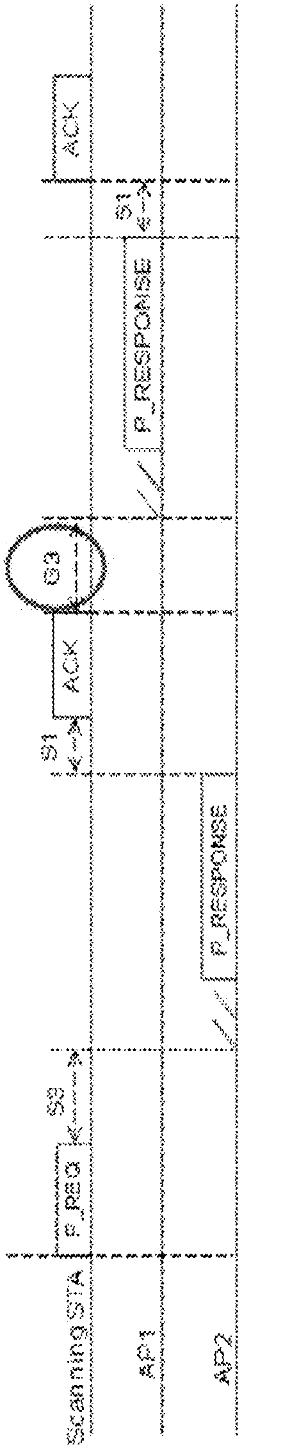
FIG. 3 shows an example of active scan procedure in IEEE 802.11.

FIG. 3 shows an example of active scan procedure in overlaid (OBSS) case in WLAN, which has two APs in the overlapping area. The scanning station detects no transmission on the scanning frequency channel (called the medium) after the ProbeDelay time expires, it sends a Probe Request with a wildcard SSID and starts the ProbeTimer. The responder (AP2) operating on the scanning frequency channel detects the Probe Request. AP2 contends the medium and sends a Probe Response after DCF Inter Frame Space (DIFS)+a random backoff time. If the scanning station receives this Probe Response, it will send an ACK after Short Inter Frame Space (SIFS). If another responder (AP1) operating on the same frequency in the same radio coverage receives the Probe Request as well, it may contend the medium with the AP2. Since the AP2 gets the medium first, the AP1 will delay a DIFS+a random backoff time to send its Probe Response to the scanning station after AP2's Probe Response is acknowledged. The scanning station will send the ACK to the AP1 after it receives the Probe Response. According to IEEE 802.11 specification, the active scanning station will stay on each channel till the ProbeTimer reaches the MinChannelTime. If there is no radio signal detected, the scanning station will reset the Network Availability Vector (NAV) and move to next frequency channel.

IEEE 802.11 defines frame priorities and inter-frame spaces for the station to contend the medium.

Figure 4:
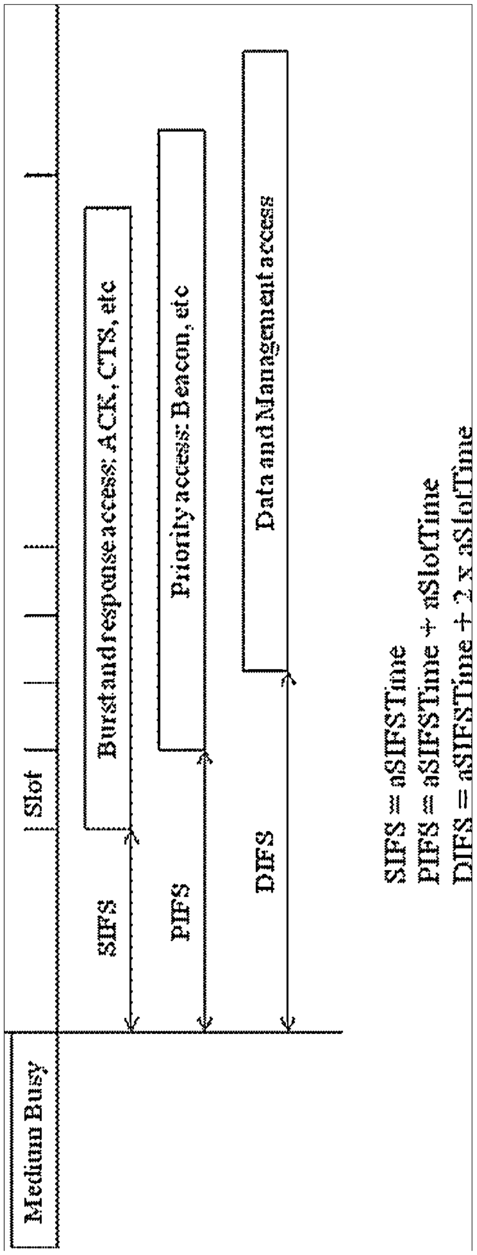
FIG. 4 shows an example of Inter Frame Spaces used in IEEE 802.11.

FIG. 4 shows an example of different Inter Frame Spaces (IFS) used in IEEE 802.11. IEEE 802.11 divides the medium time into Contention Free Period (CFP) and Contention Period (CP). In the CFP time, the medium is guaranteed for communicating stations to exchange data. No other stations than the communicating stations are allowed to contend this time period. In the CP time which means Network Availability Vector (NAV) is reset, all the idle stations are allowed to contend the medium for data transmission. All the stations shall monitor the medium for the medium status. After the medium becomes idle from busy state, all the stations can contend the medium for the data transmission. In order to provide different level contentions, IEEE 802.11 defines different IFSs. The Short Inter Frame Space (SIFS) is the time interval given to the highest priority frames such as ACK and CTS control frames to contend the medium. If no transmission of a control frame is detected after SIFS, the next priority level frames are allowed to contend the medium in Point Coordination Function Inter Frame Space (PIFS), such as a Beacon frame transmitted by an AP. If no transmission is detected after PIFS, then the lower level frames such as management frames or data frames are allowed to contend the medium in Distributed Coordination Function (DCF) Inter Frame Space (DIFS). The Extended Inter Frame Space (EIFS) is used for the access after error is detected.

According to the specification of IEEE 802.11, the responding stations shall send the responses within the maximum probe response time after receiving the Probe Request. When many stations perform active scan to speed up the link setup process, it may trigger the congestion over the air link within that period because:

a) each Probe Request message only allows to carry one SSID. Therefore a station has to send multiple Probe Requests if it needs to address to multiple SSIDs, b) it may trigger many APs to respond with Probe Responses if the station sends a Probe Request with the wildcard SSID and there are many APs in the radio coverage area, c) it may cause the associated stations to send Probe Requests if the AP in a BSS is reset.

In addition to above reasons, which may cause too many Probe Requests and Probe Responses transmission over the medium, another issue in the existing IEEE 802.11 specification impacts the link setup and causes medium time waste, especially in the frequently short length frame transmission.

In FIG. 4, it shows that the data frame or management frame can only contend the medium after S3 (DIFS=SIFS+2× SlotTime) time if no other frame occupies the medium in the previous inter frame space. All the idle station cannot enter the medium in SIFS time interval because that interval is reserved for signaling such as ACK or CTS. Since the scanning station just sends an ACK signaling, the previous CFP is ended and no ACK or CTS needs to transmit. Therefore all the idle stations have to wait for some unnecessary time before they can start contention. This wastes the medium time between two CFPs.

IEEE 802.11 supports power saving mode operation for battery operated stations. A power saving station could be a non-TIM station, which is not necessary to listen to the beacon with TIM transmitted from the AP periodically. A power-saving station is allowed to use Power Saving poll (PS-Poll) message to check whether the AP has data pending for them. If the AP has some buffered data for this requesting station, the AP shall respond immediately to the station with either buffered data or an RTS frame indicating data is buffered and requesting the station stay awake. If the AP has no pending data for the station, it will send a no data indication. The station will then go back to sleep if it has no other data to send to the AP. In this way, stations could communicate with the AP but may not be necessary to listen to beacons periodically. Therefore non-TIM mode stations could be able to sleep longer time for power saving.

A power saving station uses the listen interval field in the Association Request to indicate how often to listen to beacon management frames. When a power saving station wakes up, it is allowed to send a PS-Poll at any time. Since the power saving stations may sleep hours and AP may update its parameters during the sleeping period, it might be necessary for the AP to indicate stations whether its configuration has been changed or not. If the AP indicates the configuration has been changed, the power saving stations may need to perform active or passive scan before sending a PS-Poll or other message to the AP. However, the existing specification does not provide a mechanism to allow AP to indicate whether the configuration is changed or not, and to allow non-AP power saving stations to check the indication to determine whether a new channel scan is necessary.

This document discloses techniques for AP to fast-control active scan, authentication, association, or a PS-Poll according to the resource availability of the AP (e.g., computational resources or transmission bandwidth resources) and mechanisms to improve the medium usage efficiency for the fast link setup via reduced interframe spaces (gaps).

In order to control active scan capable stations or power saving stations to congest the medium an indication called the Access Blocking (AB), or Access Control Blocking (ACB) is introduced in downlink frames transmitted by AP.

AB is an indication used to indicate access mode controlled by the AP: access permitted mode, access blocking mode and/or access deferring mode. If an AP sets the AB field to "0", it means the access blocking is disabled and stations are allowed to access to the AP using the current access procedures in IEEE 802.11 and send Probe Requests, Authentication Request, Association Request or PS-Poll to the AP. If an AP sets the AB field to "1", it may indicate that the access blocking is enabled and stations are not allowed to transmit Probe Request, Authentication Request, Association Request, or PS-Poll to the AP now. Stations may be able check the medium availability at a later time, which depends on the implementation of stations. If the received AB becomes "0", stations can follow the access procedure to contend the medium in the contention windows.

In the access deferring mode, AP may set the AB field to a value greater than "1", which may indicate to stations that the access to the medium is deferred. The active scan capable stations or power saving stations may defer access to the medium at least in the time value indicated by the AB field. The actual deferred time could be randomized for each station depending on the implementation of station. After deferring time, an active scan or power saving station can check the availability of AP to determine whether they can access the AP over the medium. For example a value "2" in the AB field indicates to the Stations that they should defer access procedure for 2 seconds. A station may enter sleep mode during the 2 second period. At the end of the time specified in the field (2 seconds in this example), the station may wake up after a random time (e.g., a random time between 0 to 1 second after the 2 second period) and then attempt access procedure after a second random time interval (e.g., another random time period between 0 to 1 second).

The AB indication can be included in either the PHY header field or the MAC header of downlink frame transmitted by the AP.

Figure 5:
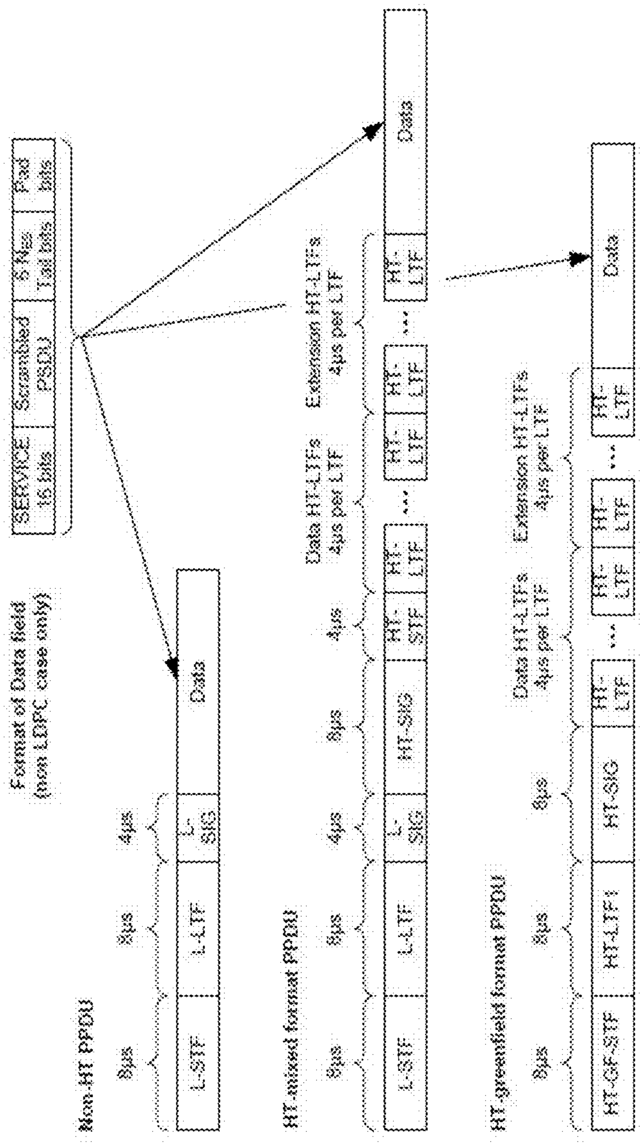
FIG. 5 shows an example of IEEE 802.11 PHY PPDU structure.

FIG. 5 shows an example of IEEE 802.11 PHY PPDU structure. For a non-HT protocol data unit (PPDU), a PHY frame consists of a non-high throughput short training frame (L-STF), a non-high throughput long training frame (L-LTF), a non-high throughput signal frame (L-SIG), and data frame. For a mixed HT PPDU, it consists of a L-STF, a L-LTF, L-SIG, a high throughput signal frame (HT-SIG), a high throughput short training frame (HT-STF), one or more high throughput long training frames (HT-LTF) and a data frame. The data frame could carry a MAC control signaling, MAC management message or user data. For a green field HT PPDU, it consists of a HT-GF-STF, a HT-LTF1, HT-SIG, one or more HT-LTF a data frame. The data frame could carry a MAC control signaling, MAC management message or user data.

Figures 6, 7:
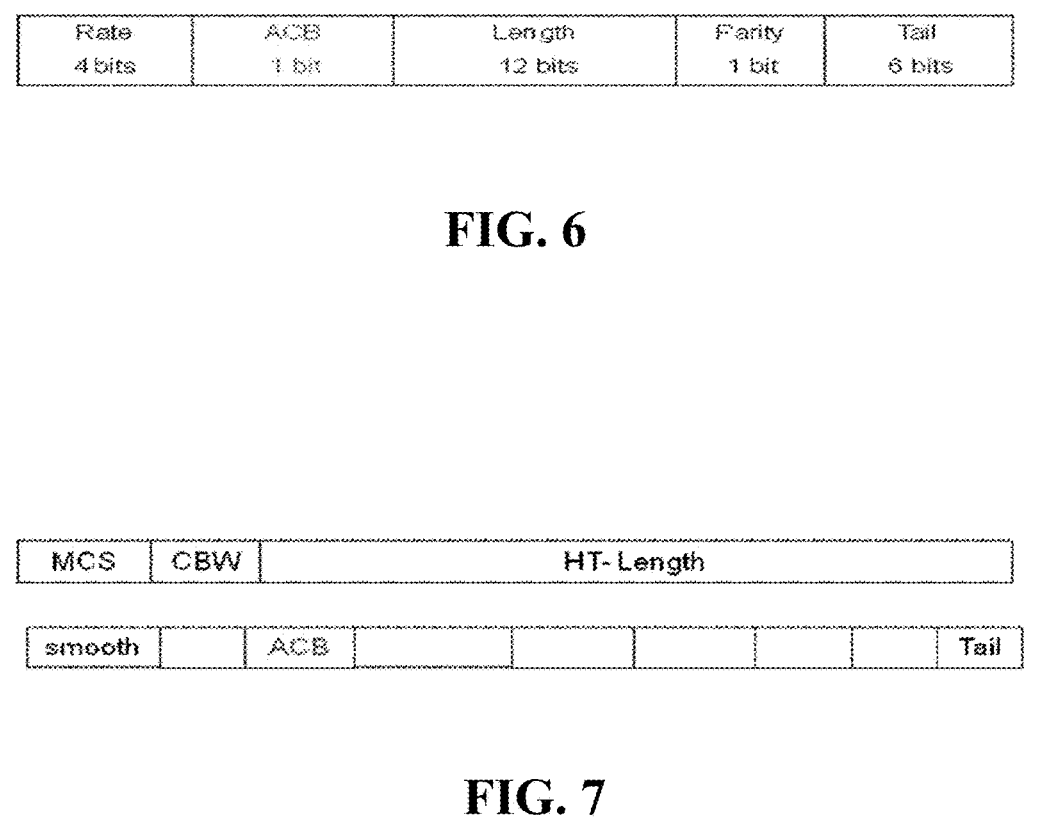

FIG. 6 illustrates an example of including the AB (one bit in this example) in L-SIG of PHY frame. Other possible placements and number bits may be possible. Because the AB bit can be transmitted by repurposing a reserved field, legacy stations are expected to ignore this bit.

FIG. 7 shows an example of the AB bit included in HT-SIG field of PHY frame. The AB bit could be included in the short HT-SIG format of PHY as well.

Figure 8:
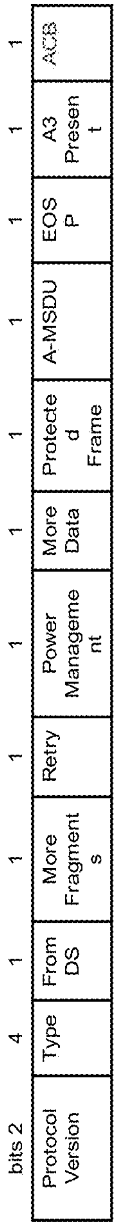
FIG. 8 shows an example of Access Blocking Bit included in MAC header of short beacon.

FIG. 8 shows an example of the AB indication included in IEEE 802.11 MAC header of short beacon. The AB field can also be encapsulated in an information element (IE) in MAC frame.

The AP may set and broadcast the AB field to "1" according to following conditions:

a) Target Beacon Transmit Time (TBTT) is approaching when AP receives a Probe Request frame. There is no need to include system parameters of BSS in the Probe Response. AP then may set the AB to "1" in PHY SIG of downlink frames temporarily till the TBTT to force active scan capable stations or power saving station to listen to beacons to get last system information, or b) AP changed its configuration parameter and would like power saving stations to perform a new scan, or c) AP experiences overloading with TIM based traffic or other congestion such as in the processor or backhaul link, and would like temporarily reduce traffic from new stations by disabling active scan, authentication, association or PS-Poll. In this case, the AP may set the AB to "1" in PHY or MAC header of every downlink frame transmission.

If AP experiences the medium or backhaul congestion but not severe to the blocking threshold, it can choose the deferring access from new stations via setting AB to a value greater than "1" to indicate the time interval that stations can re-check availability of AP.

Otherwise, AP may set AB to "0" to permit active scan stations or power saving stations to access the medium using the access control mechanism based on its access category.

The non-AP stations may monitor the medium to determine AB field transmitted from AP.

Figure 9:
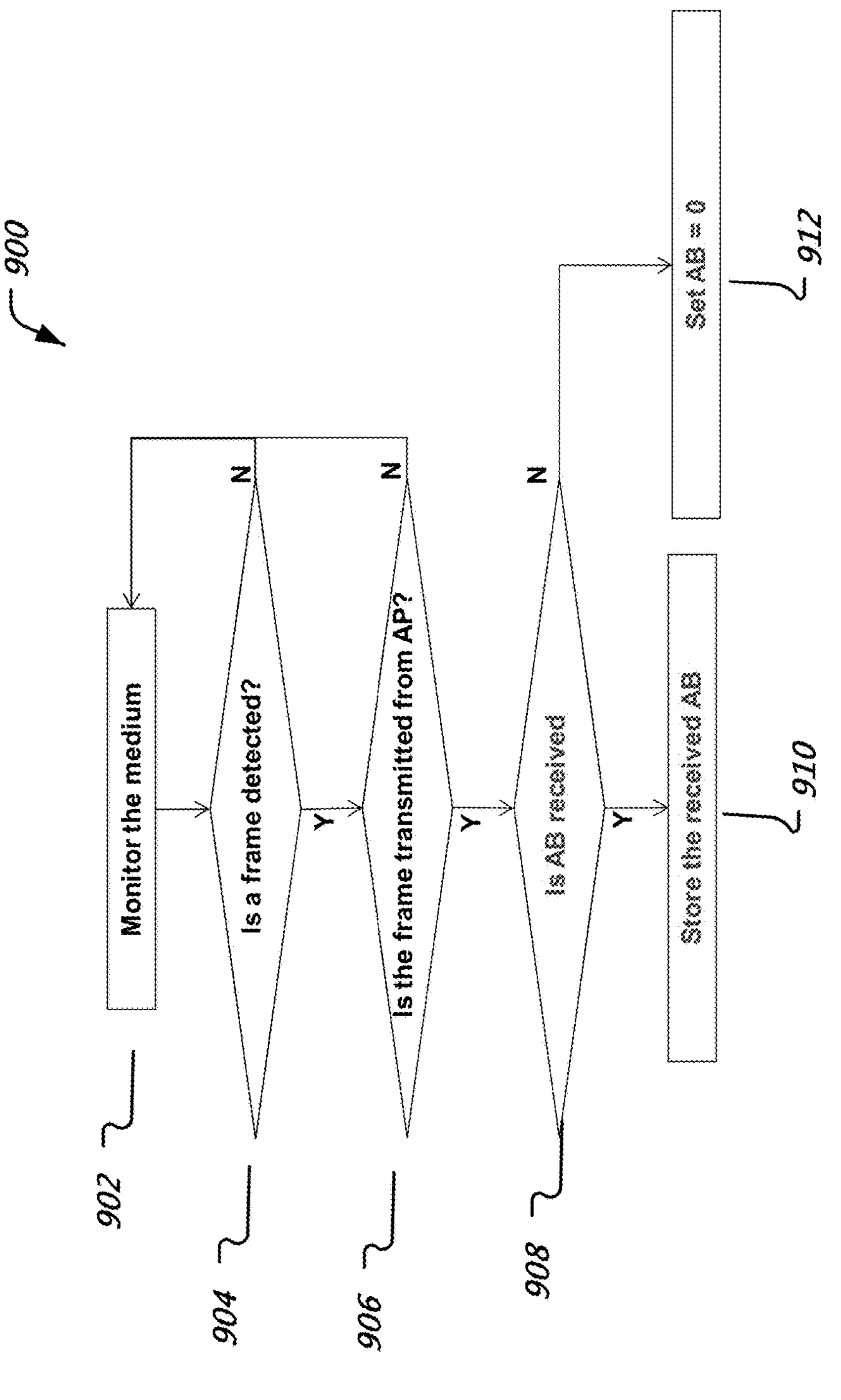
FIG. 9 is a flow chart representation of a procedure for a station to determine access blocking.

FIG. 9 shows an example of access blocking determination procedure 900. A station monitors the medium status (902) for whether or not transmissions are taking place over the medium. If it detects transmission over the medium (904), the station checks the PHY or MAC header of the transmission frame by comparing source address field to determine whether the frame is from the associated AP or other stations (906). If the transmission is from the AP that the station is associated with, it checks the AB field in PHY or MAC header (908). If AB field is received, the station shall store in the local variable of AB (910). Otherwise, if the AB field is not received or set to "0", then the station sets the local variable of AB to "0" (912). The station decides whether it can contend the medium for transmitting a Probe Request, Authentication Request, Association Request or PS-Poll in the next contention window(s) according to the stored AB. If the stored AB is set to "0", the station follows the current procedure (e.g., as specified by IEEE 802.11) to contend the medium. Otherwise, the station refrains from contending for the medium, e.g., for transmitting a Probe Request, Authentication Request, Association Request or PS-Poll.

If the received AB is greater than "1", the active scan station or power saving station can defer the access at least by the time indicated by AB field. After the deferring time, the station can re-check the status of AP whether the access is permitted.

The stations continues monitoring frames sent from the AP and update the stored AB field according to received information.

In order to reduce the wasted medium time (i.e., the time when no station or AP is transmitting) and thus improve medium use efficiency, this document also teaches to use reduced Inter Frame Spaces of PIFS, DIFS and AIFS for the contention in the inter contention free period:

Reduced PIFS (RPIFS)=PIFS−SlotTime=SIFS

Reduced DIFS (RDIFS)=DIFS−SlotTime=SIFS+SlotTime

Reduced AIFS (RAIFS)=AIFS−SlotTime.

Figure 10:
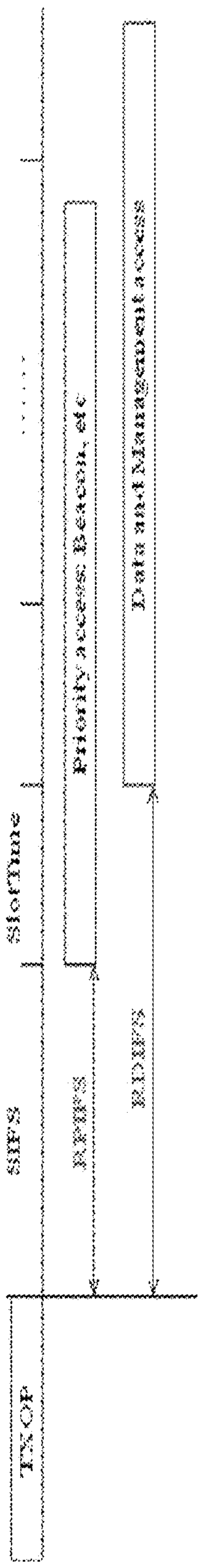
FIG. 10 shows an example of reduced inter frame spaces.

FIG. 10 shows an example of reduced inter-frame spaces. All the non-sleep stations monitor the medium status. When the medium becomes idle after communicating stations finishing the current TXOP, it enters the contention interval. The stations are allowed to transmit the priority frames such as Beacon after the RPIFS time. If there is still no traffic detected before RDIFS, stations are allowed to transmit data or management frames in the RDIFS time.

To avoid idle stations to accidently enter the contention free interval which is reserved for the communicating stations to exchange messages or data, only the idle stations that have detected the end of CFP can start contention in reduced PIFS/DIFS/AIFS intervals. The legacy stations that detect of end of CFP start contention in regular PIFS/DIFS/AIFS intervals. To help stations to detect the end of contention free period, the "More Data" field may be used in the MAC header of frames.

Figure 11:
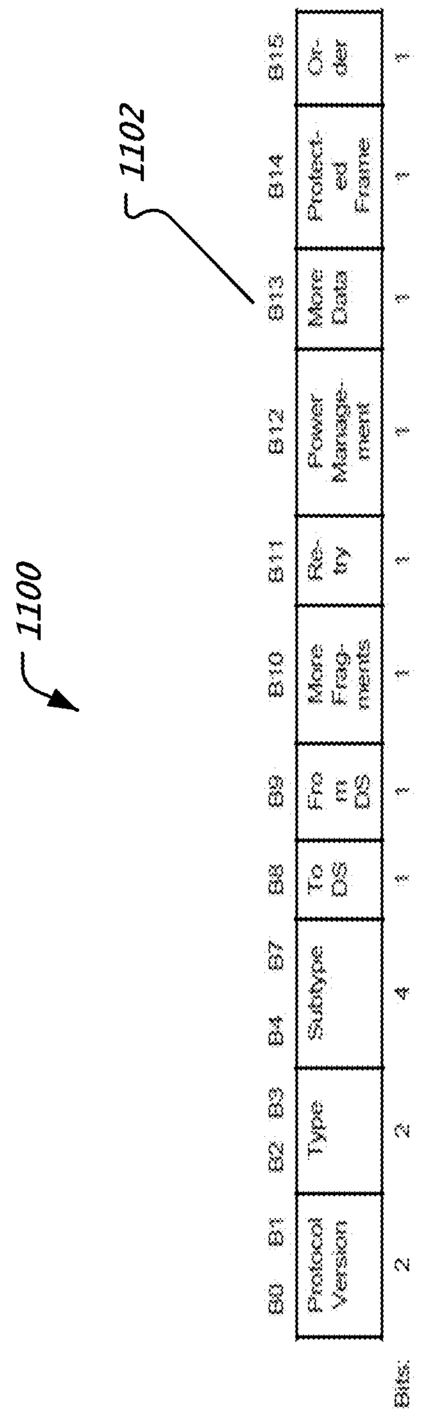
FIG. 11 shows an example of More Data field in MAC header.

FIG. 11 shows an example of More Data field 1102 in MAC header 1100. The More Data field 1102 is 1 bit in length and used by the station to indicate whether there is more data to send. If the transmitting station has more data to be sent, it sets the More Data field to "1". Otherwise, the transmitting station sets this bit to "0".

If the transmitting station is an AP, "More Data=1" also indicates that the AP has at least one additional data buffered for the destination station.

Figure 12:
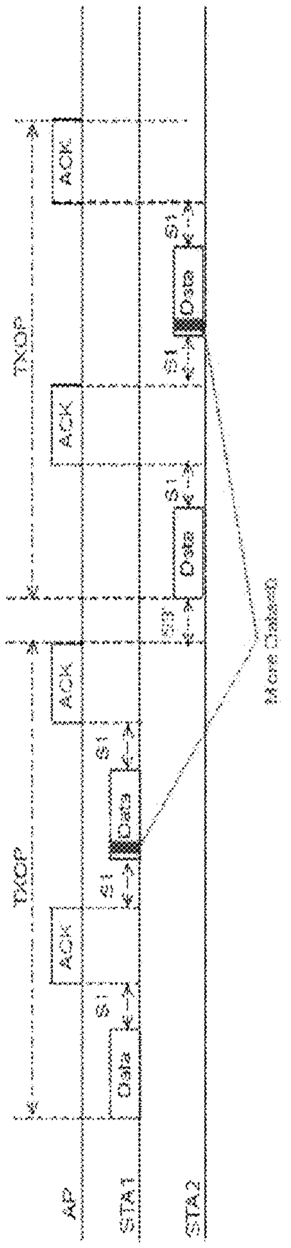
FIG. 12 shows an example of indicating the end of current CFP.

FIG. 12 illustrates a mechanism of using the More Data field to indicate the end of current CFP. As an example, the transmitting station sets the More Data field according to the following rules:

The transmitting station (STAT) sets More Data field to "1" if a. there is more data to be transmitted in the current CFP, and b. the data to be transmitted is individually addressed data or management type frames.

Otherwise, the transmitting station sets the More Data field to "0".

If the More Data field of MAC header in the frame is set to "0" by the transmitting station, the receiving station (AP in this case) may set the Duration field of ACK or CF-ACK frame to "0" to indicate the current CFP is ended by this ACK or CF-ACK frame.

In addition to indicating the end of CFP by the Duration field, the receiving station (AP) may send a CF-ACK+CF-End frame to indicate the contention free period end explicitly.

All the idle stations monitor the medium to determine whether the coming contention interval is an inter-CFP interval or not. If a station detects the Duration field of ACK or CF-ACK frame being set to "0" or receives the CF-End frame, the station declares that the next contention interval is the inter-TXOP contention interval and may contend the medium with reduced inter frame spaces: RPIFS, RDIFS or RAIFS. Otherwise, the station contends the medium with regular PIFS, DIFS or AIFS in the next contention interval.

Figure 13:
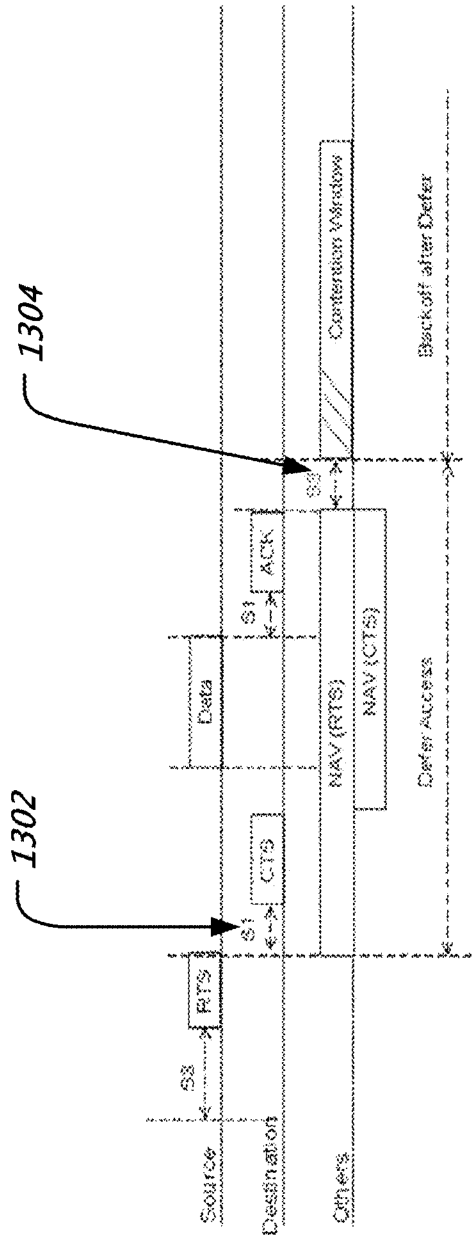
FIG. 13 shows an example of determining the inter-CFP inter-frame space by NAV.

FIG. 13 shows an example of using NAV to determine the end of inter contention free period by other stations to reduce the total transmitting time. If the source station sends a RTS to request for the medium, the target station responds with a CTS in SIFS (S1 1302). The other stations than communicating ones may defer the transmission and use the Network Available Vector (NAV) to determine the end of current contention free period. Other stations mark NAV (RTS) when it receives RTS over the medium, and set NAV(CTS) once it receives CTS transmitted from the responding station. The requesting station (source) then can transmit data packet or management frame such as a Probe Request, or control frame such as a PS-Poll after it receives the CTS from a destination station. If the transmitted data is acked or the management or control frame's exchange between the source and destination stations is completed, the other stations will mark NAV is ended based on the information in ACK or CF-ACK frame and can contend the medium in the reduced DIFS time (S3' 1304).

Using RTS to sense the medium first before transmitting a Probe Request or PS-Poll allows the transmitting station to be able to enter the contention period earlier and get a response (CTS) faster than sending a Probe Request or PS-Poll directly. If there is no response from the AP(s), the transmitting station may go to other frequency in the scenario of active scanning. With this approach, it could help to improve the link setup performance significantly.

Figure 14:
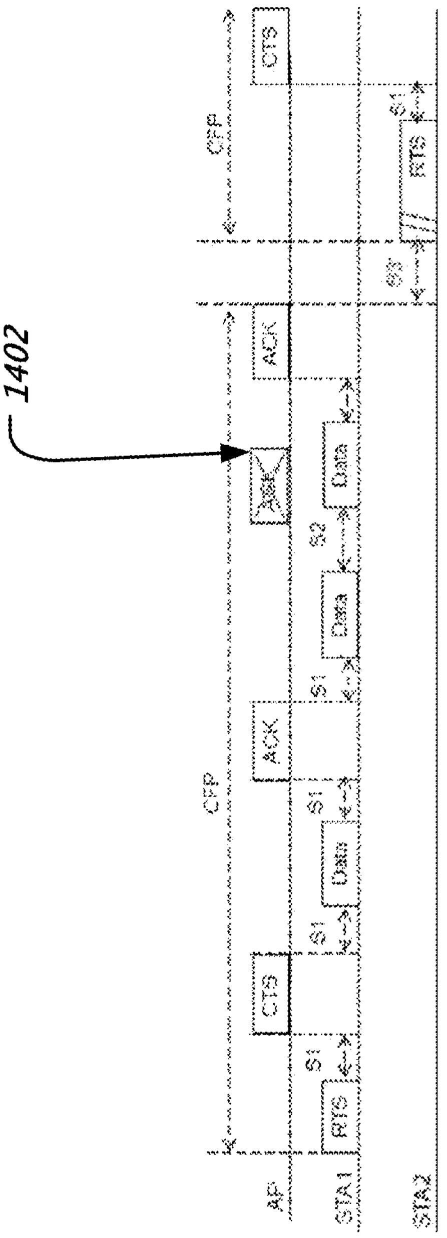
FIG. 14 shows an example of retransmission in the CFP.

FIG. 14 shows an example of retransmission in the CFP. The station (STA1) transmits the data to AP, On the second packet transmission, the AP does not receive the transmitted packet from the STA1 (1402), and does not send the CF-ACK back. The STA1 detects no ACK in S2 time after it completes the second packet transmission, it will re-send the same packet. The current CFP will be extended.

If the AP receives the data transmitted from the STA1, it will send an CF-ACK to response the retransmitted packet. Other stations using the inter-CFP determination mechanism will not contend the retransmission period with the STA1. After the extended CFP is ended, other stations with inter-CFP determination capability will contend the medium with reduced inter-frame spaces.

If the AP sends the CF-ACK to respond to the retransmitted packet but the communicating station (STA1) does not receive it, the STA1 can learn that the retransmitted packet has been acknowledged from the medium occupancy after S3'.

Figure 15:
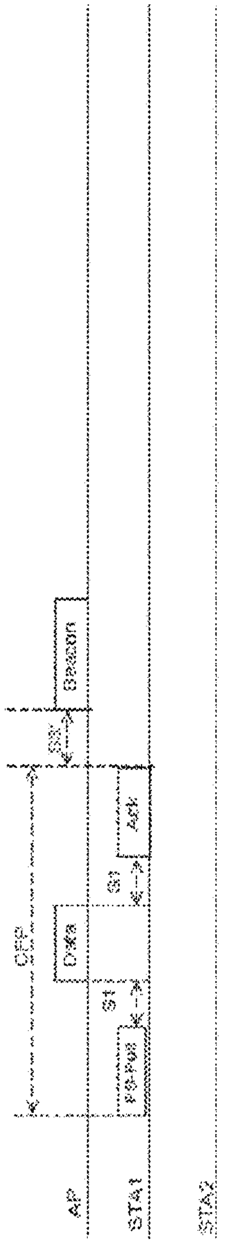
FIG. 15 shows an example of transmitting beacon signal with RPIFS.

FIG. 15 shows an example of transmitting beacon frames by AP in the reduced PIFS interval. After AP finishes the previous contention free period, i.e. completes PLCP packet decoding of ACK frame, the AP can enter contention period. Since the beacon frame has a higher priority (RPIFS) over data frame or management frames, it will contend the medium in RPIFS earlier than data or management frames.

Figure 16:
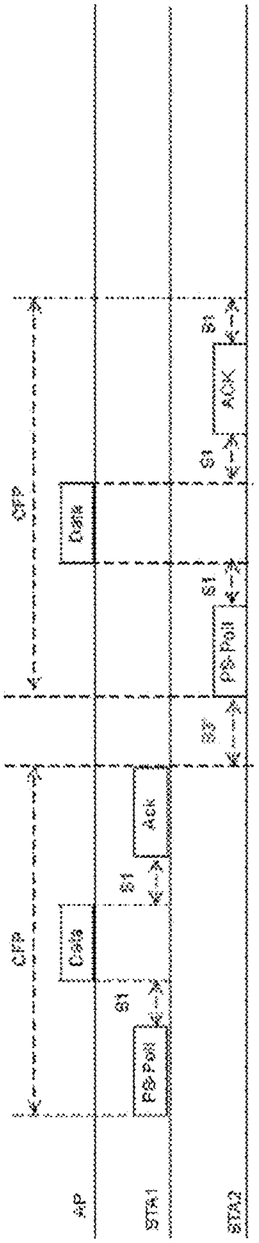
FIG. 16 shows an example of transmitting PS-Poll in RDIFS.

FIG. 16 shows an example of transmitting a PS-Poll in the reduced DIFS after previous contention free period completes. In the contention period, the other stations including the AP can be able to finish PLCP packet decoding of ACK frame and ready for the contention.

Figure 17:
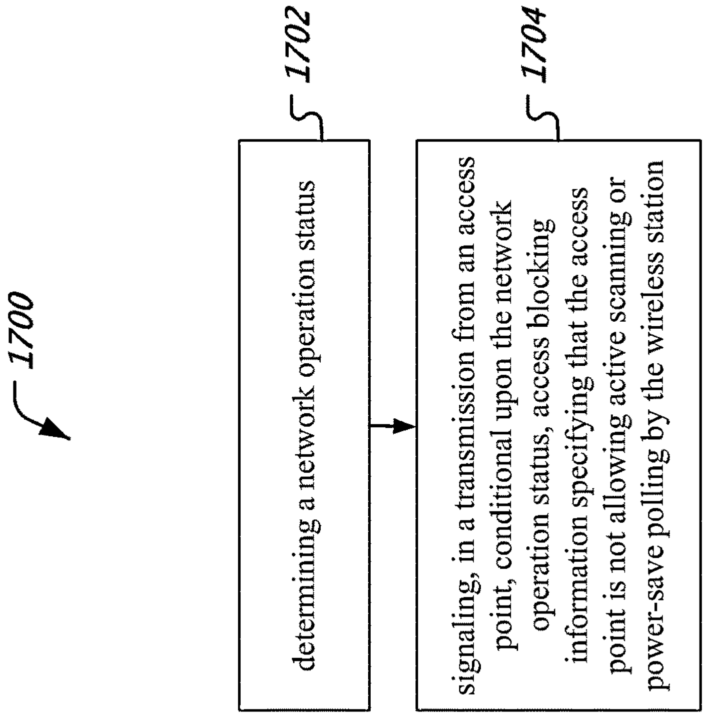
FIG. 17 is a flow chart representation of a process of wireless communications.

FIG. 17 is a flowchart representation of a process 1700 of controlling access of a wireless station to the wireless network. At 1702, a network operation status is determined. At 1704, in a transmission from an access point, access blocking information specifying that the access point is not allowing active scanning, authentication, association, or power-save polling by the wireless station is signaled conditional upon the network operation status.

Figure 18:
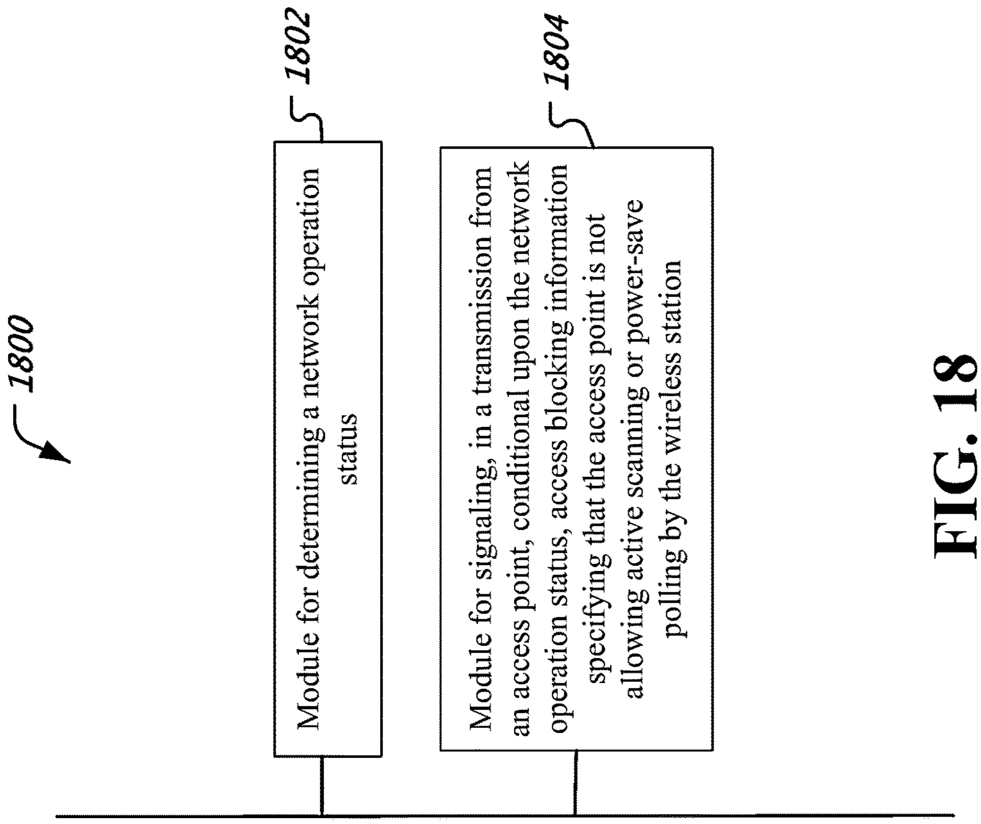
FIG. 18 is a block diagram representation of a portion of a wireless communications apparatus.

FIG. 18 is a block diagram representation of a wireless communications apparatus 1800. The module 1802 is for determining a network operation status. The module 1804 is for signaling, in a transmission from an access point, conditional upon the network operation status, access blocking information specifying that the access point is not allowing active scanning or power-save polling by the wireless station. In some implementations, module 1804 may further indicate access deferring.

Figure 19:
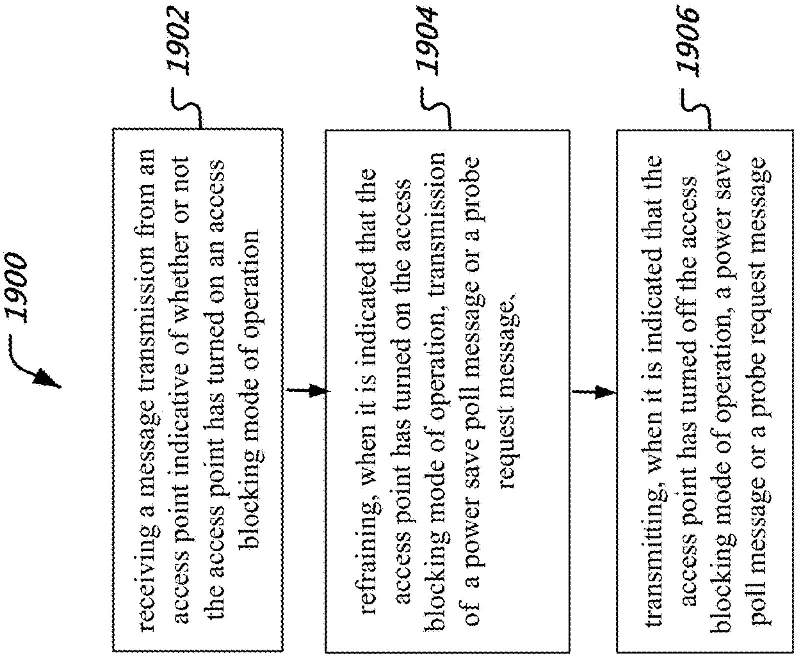
FIG. 19 is a flow chart representation of a process of wireless communications.

FIG. 19 is a flowchart representation of a process 1900 of wireless communications. At 1902, a message transmission from an access point is received, indicative of whether or not the access point has turned on an access blocking or deferring mode of operation. At 1904, when it is indicated that the access point has turned on the access blocking mode of operation, transmission of a power save poll message, a probe request message, authentication request message, or association request message is refrained from. When it is indicated that the access point has turned on the access deferring mode of operation, transmission of a power save poll message, probe request message, authentication request message or association request message is deferred to the later time. At 1906, when it is indicated that the access point has turned off the access blocking or deferring mode of operation, a power save poll message, a probe request message, authentication request message, or association request message is transmitted. As previously discussed, the network operations status may include checking time to next beacon transmission (e.g., target beacon transmission time) or checking for a need to force the wireless stations to perform a new scan or monitoring network traffic load (e.g., whether load is below 70% of capacity or other pre-determined threshold).

Figure 20:
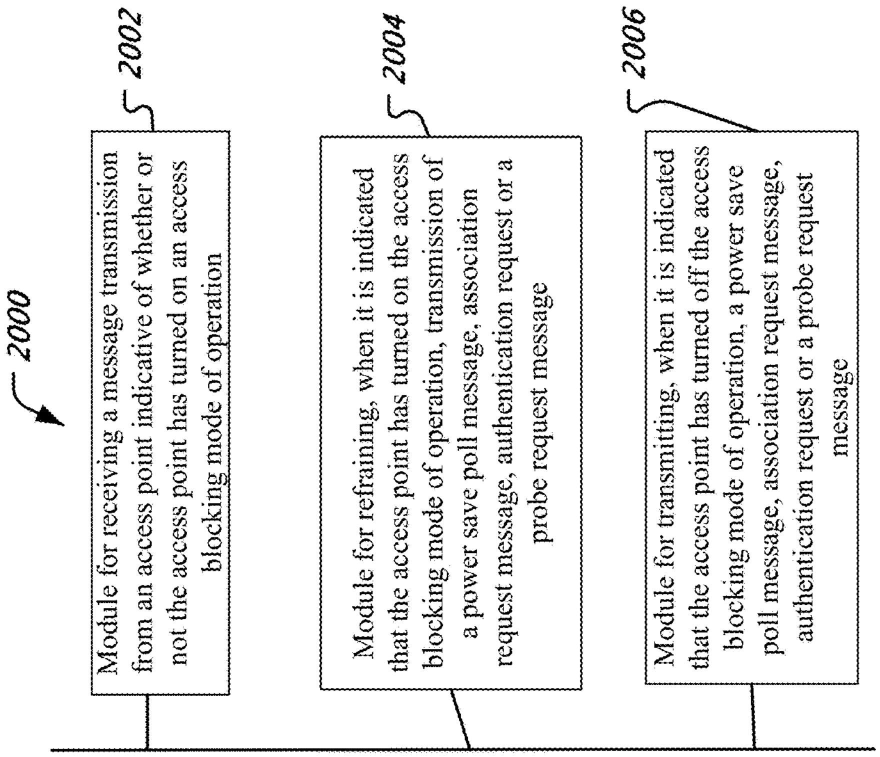
FIG. 20 is a block diagram representation of a portion of a wireless communications apparatus.

FIG. 20 is a block diagram representation of a portion of a wireless communications apparatus 2000. The module 2002 is for receiving a message transmission from an access point indicative of whether or not the access point has turned on an access blocking or deferring mode of operation. The module 2004 is for refraining or deferring to the later time, when it is indicated that the access point has turned on the access blocking or deferring mode of operation, transmission of a power save poll message, a probe request message, authentication request message or association request message. The module 2006 is for transmitting, when it is indicated that the access point has turned off the access blocking mode of operation, a power save poll message, a probe request message, authentication request message or association request message.

Figure 21:
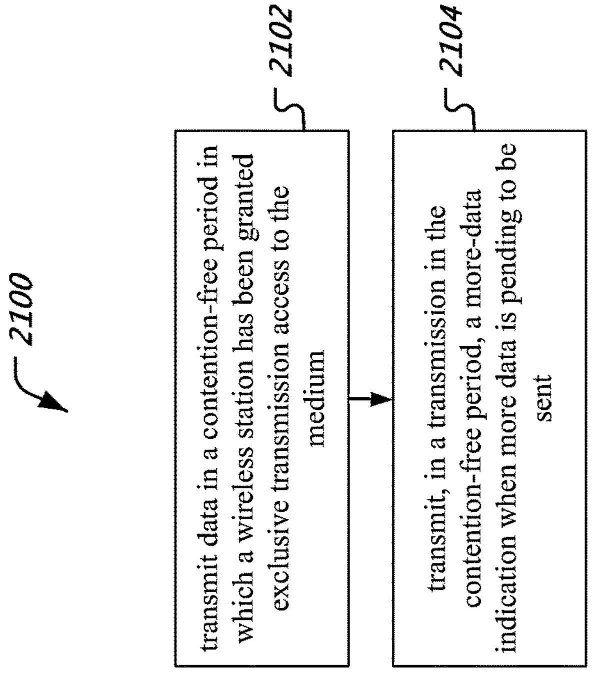
FIG. 21 is a flow chart representation of a process of wireless communications.

FIG. 21 is a flowchart representation of a process 2100 of wireless communications. At 2102, data is transmitted in a contention-free period in which a wireless station has been granted exclusive transmission access to the medium. At 2104, in a transmission in the contention-free period, a more-data indication is transmitted when more data is pending to be sent.

Figure 22:
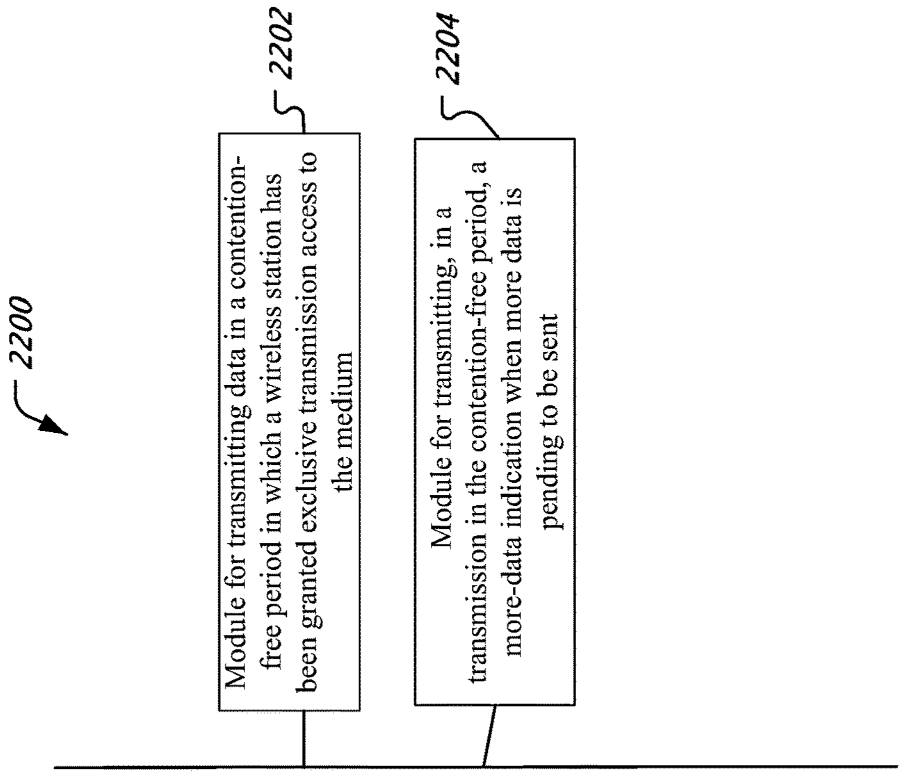
FIG. 22 is a block diagram representation of a portion of a wireless communications apparatus.

FIG. 22 is a block diagram representation of a wireless communications apparatus 2200. The module 2202 is for transmitting data in a contention-free period in which a wireless station has been granted exclusive transmission access to the medium. The module 2204 is for transmitting, in a transmission in the contention-free period, a more-data indication when more data is pending to be sent.

Figure 23:
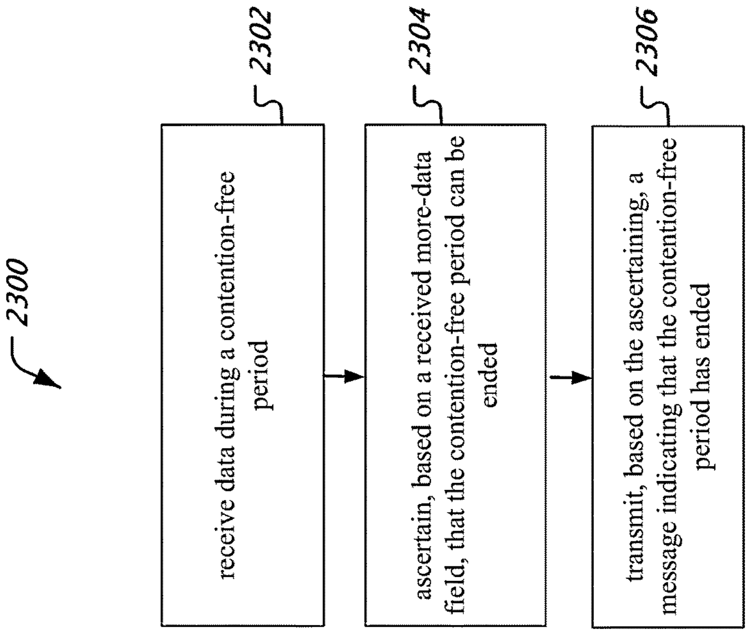
FIG. 23 is a flow chart representation of a process of wireless communications.
Figure 24:
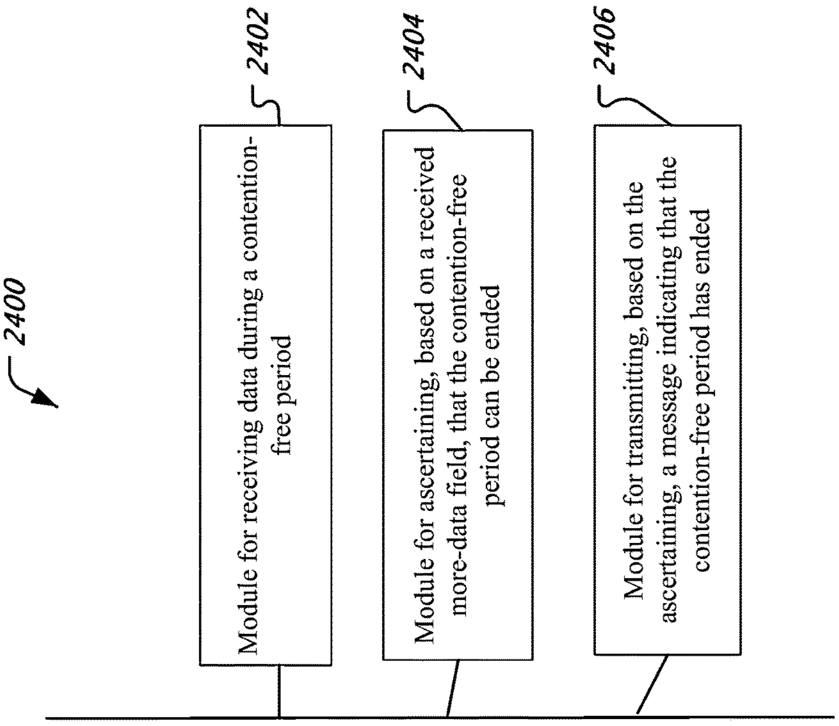
FIG. 24 is a block diagram representation of a portion of a wireless communications apparatus.

FIG. 23 is a flowchart representation of a process 2300 of wireless communications. At 2302, data is received during a contention-free period. At 2304, based on a received more-data field, it is asserted that the contention-free period can be ended. At 2306, a message indicating that the contention-free period has ended is transmitted based on the ascertaining FIG. 24 is a block diagram representation of a portion of a wireless communications apparatus 2400. The module 2402 is for receiving data during a contention-free period. The module 2404 is for ascertaining, based on a received more-data field, that the contention-free period can be ended. The module 2406 is for transmitting, based on the ascertaining, a message indicating that the contention-free period has ended.

It will be appreciated that several mechanisms have been provided for fast access link setup in a WLAN network. It will also be appreciated that the disclosed technique enable access control of wireless devices in a WLAN.

With reference to FIGS. 19 to 24, in some embodiments, the disclosed methods and apparatus can be operated in a IEEE 802.11 network, with the modifications as outlined in the present document.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A wireless communications method, comprising:
- receiving a message transmission from an access point over a medium, the message transmission including a value of access blocking information, the value of access blocking information selected from:
  - a first value specifying that the access point is currently allowing active scanning and power-save polling by a wireless station,
  - a second value specifying that the access point is currently not allowing active scanning and power-save polling by the wireless station while still allowing contention-based access by the wireless station, and
  - a third value indicative of a time period by which the active scanning or power-save polling by the wireless station is deferred;
- refraining, when the received message transmission includes the second value, transmission of a power save poll message and a probe request message while still continuing contention-based access;
- deferring, when the received message transmission includes the third value, transmission of a power save poll message or a probe request message;
- transmitting, when the received message transmission includes the first value, a power save poll message or a probe request message; and
- contending the medium with a reduced inter frame spaces during an inter contention interval.

2. The method recited in claim 1, wherein the received message transmission indicates the access blocking mode of operation in a Physical Layer (PHY) header.

3. The method recited in claim 1, wherein the received message transmission indicates the access blocking or deferring mode of operation in a Medium Access Control (MAC) header.

4. A wireless communications apparatus, comprising:
- means for receiving a message transmission from an access point over a medium, the message transmission including a value of access blocking information, the value of access blocking information selected from:
  - a first value specifying that the access point is currently allowing active scanning and power-save polling by a wireless station,
  - a second value specifying that the access point is currently not allowing active scanning and power-save polling by the wireless station while still allowing contention-based access by the wireless station, and
  - a third value indicative of a time period by which the active scanning or power-save polling by the wireless station is deferred;
- means for refraining, when the received message transmission includes the second value, transmission of a power save poll message or a probe request message while still continuing contention-based access;
- means for deferring, when the received message transmission includes the third value, transmission of a power save poll message or a probe request message,
- means for transmitting, when the received message transmission includes the first value, a power save poll message or a probe request message; and
- means for contending the medium with a reduced inter frame space during an inter contention interval.

5. The apparatus recited in claim 4, wherein the received message transmission indicates the access blocking mode of operation in a Physical Layer (PHY) header.

6. The apparatus recited in claim 4, wherein the received message transmission indicates the access blocking or deferring mode of operation in a Medium Access Control (MAC) header.

7. A wireless communications system comprising an access point and a wireless station, wherein
- the access point is configured to:
  - determine a network operation status; and
  - signal, to the wireless station, conditional upon the network operation status, a value of access blocking information, the value of access blocking information selected from:
  - a first value specifying that the access point is currently allowing active scanning and power-save polling by the wireless station,
  - a second value specifying that the access point is not allowing active scanning and power-save polling by the wireless station while still allowing contention-based access by the wireless station, and
  - a third value indicative of a time period by which the active scanning or power-save polling by the wireless station is deferred; and
- the wireless station is configured to:
  - receive data during a contention-free period over a medium;
  - ascertain, based on a received more-data field, that the contention-free period can be ended,
  - transmit a message indicating that the contention-free period has ended; and
  - contend the medium with a reduced inter frame space during an inter contention interval based on the received more-data field.

8. The wireless communication system of claim 7, wherein the signaling the access blocking information further comprises signaling the value of access blocking information via a field in a downlink transmission frame.

9. The wireless communication system of claim 8, wherein the downlink transmission frame is a PHY layer frame.

10. The wireless communication system of claim 7, wherein the determining the network operation status includes determining congestion on a backhaul link from the access point to a core network.

11. The wireless communications system of claim 7, wherein the reduced inter frame spaces comprise reduced Function Inter Frame Space (RPIFS), reduced Distributed Coordination Function Inter Frame Space (RDIFS), and reduced Arbitration Inter Frame Space (RAIFS).

12. The wireless communications method of claim 1, wherein the inter contention interval is an inter Transmit Opportunity (inter-TXOP) contention interval.

13. The wireless communications method of claim 1, wherein the reduced inter frame spaces comprise reduced Function Inter Frame Space (RPIFS), reduced Distributed Coordination Function Inter Frame Space (RDIFS), and reduced Arbitration Inter Frame Space (RAIFS).

14. The wireless communications method of claim 13, wherein the RPIFS is equal to Short Inter Frame Space (SIFS).

15. The wireless communications method of claim 13, wherein the RDIFS is equal to Short Inter Frame Space (SIFS) plus a slot time.

16. The wireless communications apparatus of claim 4, wherein the inter contention interval is an inter Transmit Opportunity (inter-TXOP) contention interval.

17. The wireless communications apparatus of claim 4, wherein the reduced inter frame spaces comprise reduced Function Inter Frame Space (RPIFS), reduced Distributed Coordination Function Inter Frame Space (RDIFS), and reduced Arbitration Inter Frame Space (RAIFS).

18. The wireless communications apparatus of claim 17, wherein the RPIFS is equal to Short Inter Frame Space (SIFS).

19. The wireless communications apparatus of claim 17, wherein the RDIFS is equal to Short Inter Frame Space (SIFS) plus a slot time.

* * * * *